(12) United States Patent
Liang et al.

(10) Patent No.: US 7,885,396 B2
(45) Date of Patent: Feb. 8, 2011

(54) MULTIPLE SIMULTANEOUSLY ACTIVE TELEPHONE CALLS

(75) Inventors: William Wen Liang, Santa Clara, CA (US); Scott Allen Henning, Plano, TX (US)

(73) Assignee: Cisco Technology, Inc., San Jose, CA (US)

(*) Notice: Subject to any disclaimer, the term of this patent is extended or adjusted under 35 U.S.C. 154(b) by 785 days.

(21) Appl. No.: 11/166,667

(22) Filed: Jun. 23, 2005

(65) Prior Publication Data

US 2007/0003044 A1 Jan. 4, 2007

(51) Int. Cl.
*H04M 3/42* (2006.01)
(52) U.S. Cl. ............... 379/202.01; 379/158; 379/162; 379/207.01; 379/421; 379/204.01; 370/352
(58) Field of Classification Search ............... 370/352, 370/356; 379/162, 163, 393, 202.01, 158
See application file for complete search history.

(56) References Cited

U.S. PATENT DOCUMENTS

| | | | |
|---|---|---|---|
| 4,506,358 A | 3/1985 | Montgomery | |
| 4,734,934 A | 3/1988 | Boggs et al. | |
| 5,027,689 A | 7/1991 | Fujimori | |
| 5,195,087 A * | 3/1993 | Bennett et al. | ............... 370/264 |
| 5,212,733 A | 5/1993 | DeVitt et al. | |
| 5,440,639 A | 8/1995 | Suzuki et al. | |
| 5,521,981 A | 5/1996 | Gehring | |
| 5,734,724 A | 3/1998 | Kinoshita et al. | |
| 6,011,851 A | 1/2000 | Connor et al. | |
| 6,768,722 B1 * | 7/2004 | Katseff et al. | ............... 370/260 |
| 7,006,618 B1 * | 2/2006 | Shaffer et al. | ........... 379/215.01 |

OTHER PUBLICATIONS

From Website: http://ezineartlicles.com/?History-of-the-Telephone----from-Bell-to-VoIP-and-Beyond&id=.... *History of the Telephone—from Bell to VoIP and Beyond*, Lucy P. Roberts, Dec. 9, 2004; 4 pages.
From Website: http://www.cisco.com/warp/public/cc/pd/mxsv/mxcvsr/ *Cisco Media Convergence Server*, Cisco Systems, Inc. Copyright 1992-2005; 2 pages.

* cited by examiner

*Primary Examiner*—Ahmad F Matar
*Assistant Examiner*—Antim Shah
(74) *Attorney, Agent, or Firm*—Marger Johnson & McCollom, P.C.

(57) ABSTRACT

A method and system for providing a user who places a telephone call on hold with a partial hold option. When a user places a first call on partial hold and picks up a second call, the user can still hear conversation and activity that occurs on the first call. For example a user participating in a conference call may receive a second call. The user can place the conference call on partial hold and pick up a second call (i.e. engage in a conversation on a second telephone call). However, the incoming channel to the conference call will remain active and the user will be able to hear, in the background, what is taking place in the conference call. Should the user hear something interesting in the conference call, or if the user hears someone ask a question directed to the particular use, the user can switch back to the conference call.

23 Claims, 4 Drawing Sheets

US 7,885,396 B2

MULTIPLE SIMULTANEOUSLY ACTIVE TELEPHONE CALLS

FIELD OF THE INVENTION

The present invention relates to telephony and more particularly to features of telephone systems.

BACKGROUND

In general, there are two types of telephone calls. In the first and most common situation, there is a single calling party and a single called party. In the second type of call, generally referred to as a conference call, a number of parties are connected together.

It is noted that telephone calls are placed to particular telephone numbers (that is to particular telephones) and not to specific individuals. However, to facilitate the explanation of the applicant's invention, herein, the term called party will be used to mean a particular telephone with a particular telephone number and a particular user. That is, as used herein, the term, called party does not refer to an individual; instead it refers to a particular telephone and the user of that particular telephone. Likewise, the term user as used herein refers to an individual that is utilizing a particular telephone handset with a particular telephone number.

Some telephone systems allow a telephone user to place a first call on hold, so that the user can pick up, that is, connect to a second call. In such a situation the party placed on hold either hears nothing or in some systems, the party placed on hold is connected to a unit that provides "hold" music. The user who placed the call on hold is connected to the second call and that user hears nothing more relative to the first call until he switches back to the first call. The user switches back to the first call either because the second call has been terminated or because the second call was placed on hold.

There are many different types of telephone systems in general use that include the type of "hold" function described above. The most widely used type of system is the type of system often referred to as a POTS system (Plain Old Telephone Service) that uses the Public Switched Telephone Network (PSTN). More modern telephone systems use high speed digital protocols such as the technology known as Integrated Services Digital Network (ISDN) or Fiber Distributed Data Interface (FDDI). Another type of telephone system in widespread use is the cellular type of telephone system that uses a radio frequency communication protocols. More recently, telephone systems that use a Voice over Internet (VoIP) protocol have come into wide spread use. The type of hold function described above has been implemented on substantially all types of telephone systems such as those mentioned above.

The embodiments described below provide a system and method whereby a user has available an expanded number of options that can be employed when a call is placed on "hold".

SUMMARY

A method and system are described herein for providing a user who desires to place a telephone call on hold with an additional option. In the embodiment described below a user can place a first call in a "partial hold" mode and pick up a second call. When someone places a call in partial hold mode, they can still hear conversation and activity that occurs on the call. For example, a first user participating in a first call may receive a second call. The first user can place the first call in a partial hold mode and pick up the second call (i.e. engage in a conversation on a second telephone call). However, the incoming channel of the first call will remain active and the first user will be able to hear, in the background, what is taking place in the first call. The second party on the first call will not be able to hear anything that the first user says. Should something occur on the first call (for example, the second party might say he can wait no longer), the first user can place the second call on hold and switch back to the first call.

With the embodiments described below, a user will be able to switch between two active calls. At any particular time, the use can select to (a) make one call active (i.e. be able to hear and transmit), and at the same time to (b) place the second call in a partial hold mode so that the second call operates in a muted mode (that is, a user will hear what is happening, but others on the line will not hear that user).

DETAILED DESCRIPTION

Figure 1:
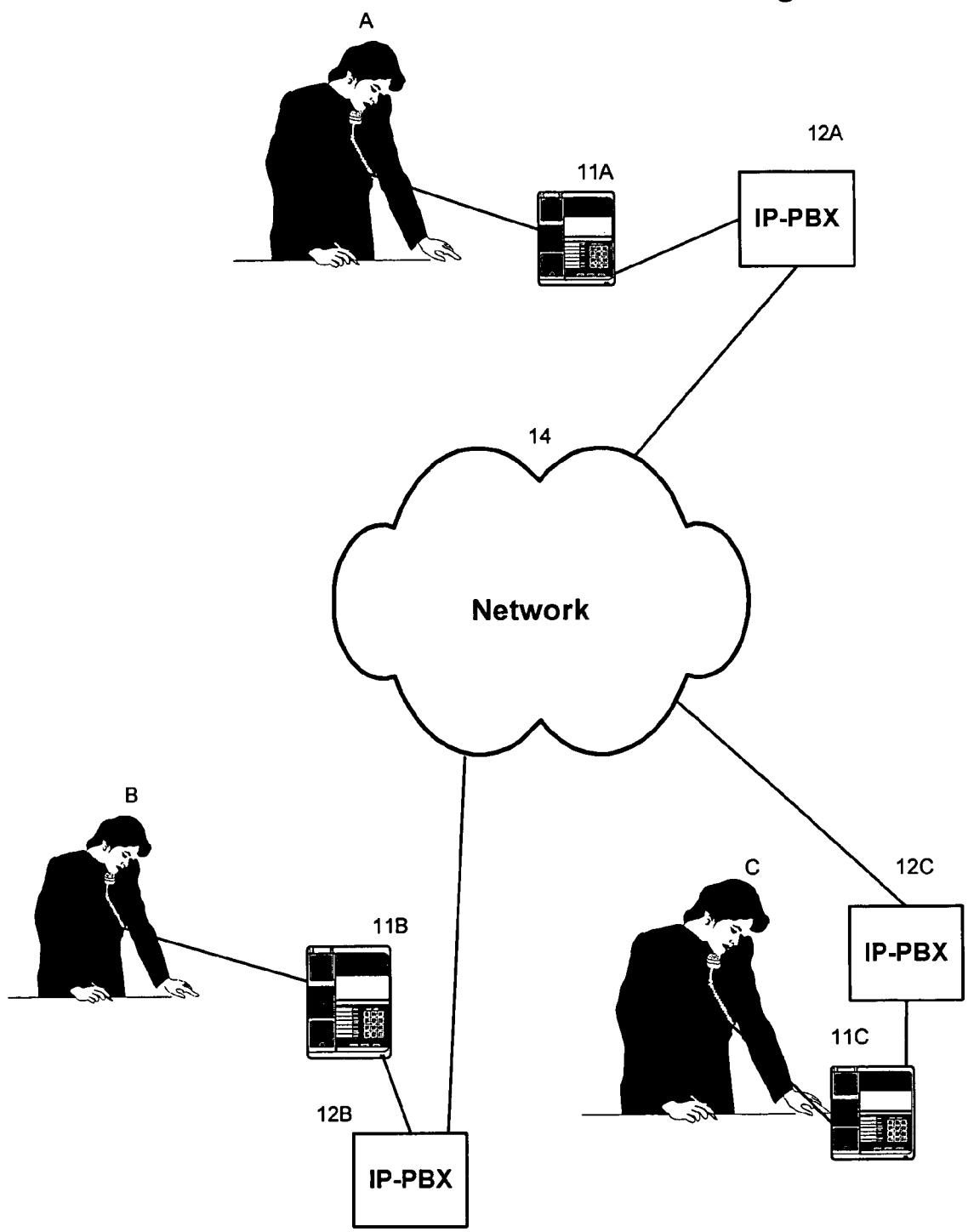
FIG. 1 illustrates a first embodiment that includes a VoIP telephone system and several users engaged in telephone conversations

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate the preferred embodiments of the invention and the operation of such embodiments. In the figures, the size of the boxes is not intended to represent the size of the various physical components. Each particular reference numeral is used to denote the same element in multiple figures.

Only those parts of the various units are shown and described which are necessary to convey an understanding of the embodiment to those skilled in the art. Those parts and elements not shown are conventional and known in the art.

The present invention can be implemented in many different types of telephone systems. The first specific embodiment described below relates to a Voice over Internet Protocol (VoIP) system. However, it should be understood that the invention can be implemented in almost any type of telephone system.

Thus, while the specific embodiments described below relates to a VoIP system, the present invention is not limited to use in VoIP systems. The present invention is useful in all types of telephone systems, including cellular systems and Plain Old Telephone Systems (POTS systems).

FIG. 1 shows an example of several people engaged in a telephone conversation. It should be understood that the situation illustrated in FIG. 1 is merely one simple example that will be used to explain the first embodiment. Many other different call scenarios can be handled in a manner similar to that specifically described herein.

The example shown in FIG. 1 involves three users, designated A, B, and C. The users A, B, and C can place calls to each other through IP-PBXs. Each user has a VoIP telephone handset. User A has a handset 11A, user B has handset 11B and user C has a handset 11C. Each of the handsets is connected to an IP-PBX. That is, handset 11A is connected to IP-PBX 12A, handset 11B is connected to the IP-PBX 12B, and handset 11C is connected to IP-PBX 12C. IP-PBXs 12A, 12B and 12C are in turn connected to a wide area network 14 that can be the Internet.

As a first specific example, consider the situation where:
1) Users A, and B are conducting a telephone conversation over a first connection. This connection will be referred to as the first telephone call.
2) During the first telephone call, user A receives a second telephone call from user C. Conventional caller ID will inform user A of this call.
3) User A places the first call on hold (in a mode herein called partial hold) and picks up (i.e. connects to) the call from user C.

With the first embodiment of the invention, described below, user A will continue to hear (in the background) what transpires in the first call during the conversation with user C. The background sound from the first call will be at a lower lever than the sound from the conversation with user C. If at some later time user C hears something transpiring in the first call that is of interest, user C can place caller C on partial hold and join the first call. For example, user A may hear user B say "I can not hold on any longer, I will call you tomorrow". User A may choose to return to the first call to say "goodbye".

It is noted that in the above example, the user chooses to place the calls on partial hold. In the first embodiment, the user has two keys available. One of which places a call on partial hold and the second of which places a call in a conventional hold mode.

That is, with the first embodiment, user A will have two options available. First, user A will be able to place a call in a conventional "hold" mode. Second, user A will be able to place a call in a "partial hold" mode where any sound that occurs on the call placed on partial hold will be heard in the background. If user A places a call from user C in partial hold mode, if user C speaks, user A will still hear what is said as a background sound; however, user C will not hear what user A says. Partial hold mutes the outgoing portion of a call.

Figure 2:
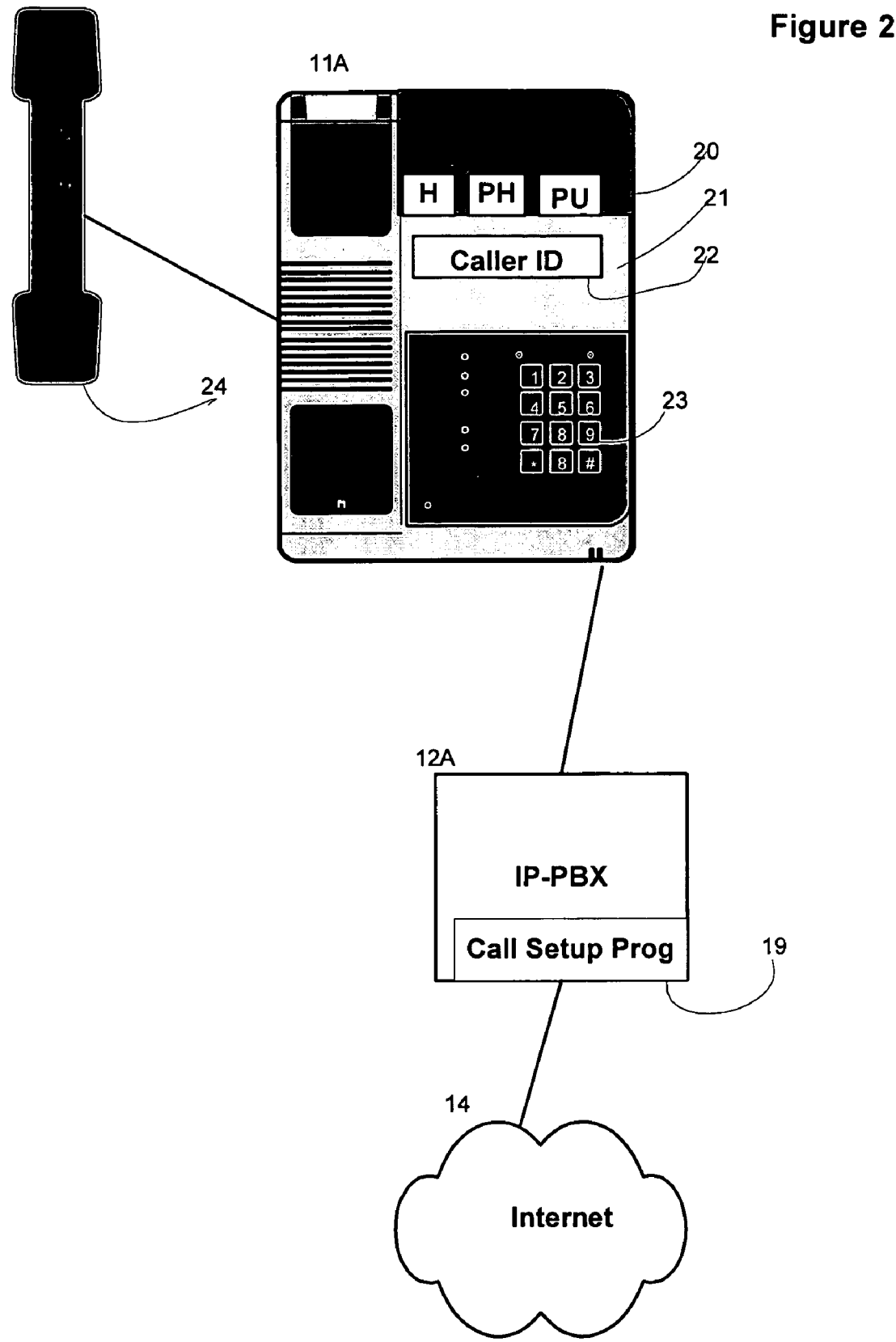
FIG. 2 illustrates a handset and a IP-PBX.

FIG. 2 shows the handsets 11A and the IP-PBX 12A in more detail. Of importance is the fact that handset 11A includes three keys 20 (designated H, PH, and PU), a screen 21, a caller ID display 22, and a conventional numeric keypad 23. The three keys designated H, PH and PU have the following meanings.

H is a conventional "hold" key.
PH is a "partial hold" key
PU is a key to pick up the call identified on the caller ID screen The handset 11A also has a hand piece 24. For convenience of reference, the entire unit 11A will be referred to as a handset and the part that a user manually holds will be referred to as a hand piece.

The IP-PBX 12A includes call setup software 19 that performs the normal call setup operations; however, IP-PBX 12A also performs the additional functions described below. Handset 11A can be a conventional VoIP handset that has the additional partial hold functions described herein.

Figure 3:
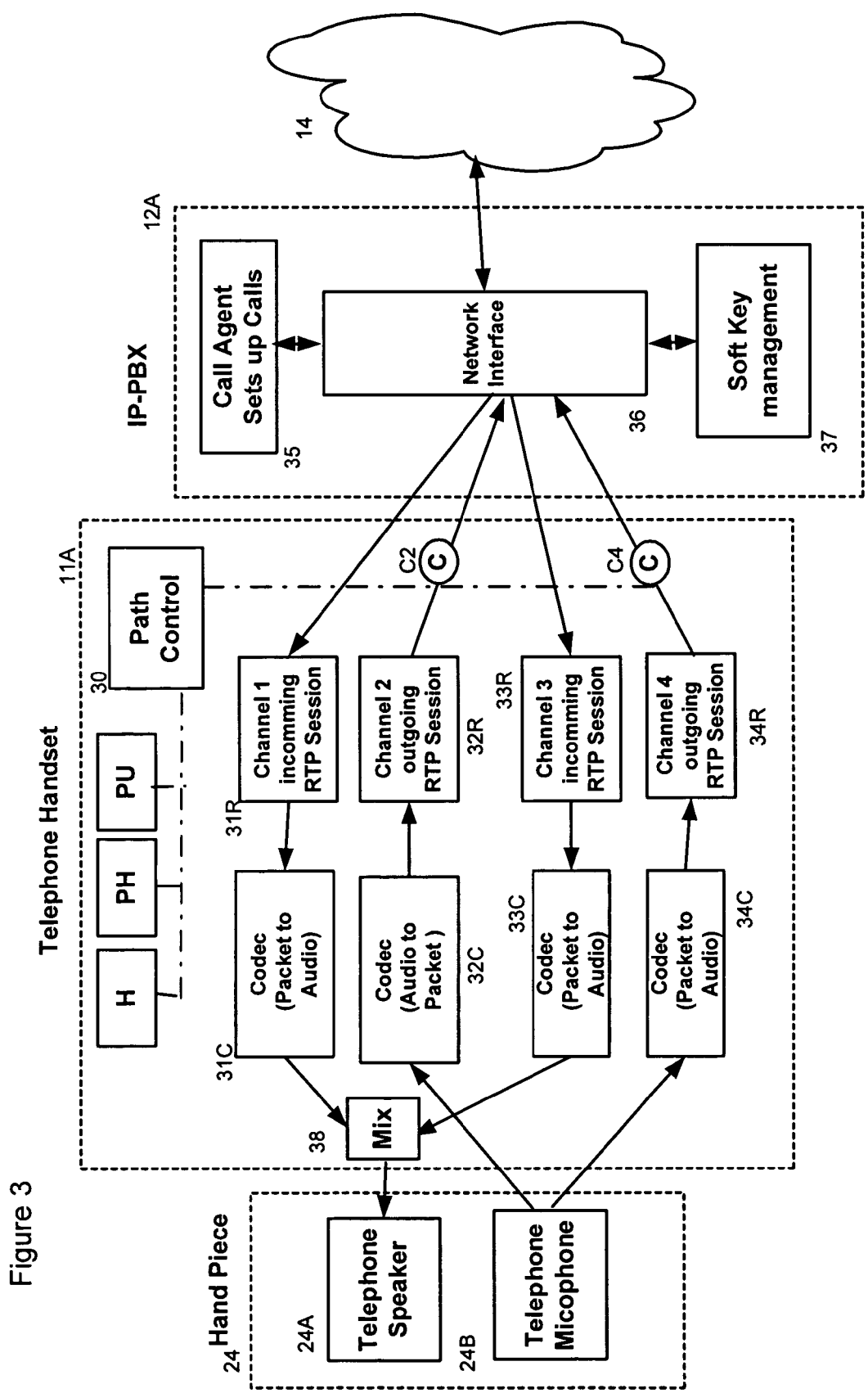
FIG. 3 is an overall system diagram of an IP-PBX and handset in a first embodiment.

FIG. 3 shows in more detail a block diagram of the central components of the first embodiment of the invention. FIG. 3, includes more details of the IP-PBX 11A and of the VoIP handset 11A. Those parts and components of the IP-PBX 11A and of the handset 11A that are not shown in the figure are conventional.

As is conventional the IP-PBX 12A sets up telephone calls that originate or terminate at handset 11A. The IP-PBX 12A includes a conventional call agent 35 that sets up the calls. Setting up telephone calls involves establishing two media paths for each call. One media path handles incoming packets and the other media path handles outgoing packets. Each media path includes an RTP session and a codec. The codec and the RTP session are processes that operate on a Digital Signal Processors (DSPs) located in the telephone handset 11A. The DSP itself is not explicitly shown in the Figure and it is conventional.

The hand piece 24 is connected to the handset 11A. The hand piece 24 includes a conventional speaker 24A and a conventional microphone 24B.

Specifically, the exemplary programming components shown in FIG. 3 related to the example illustrated in FIG. 1. For the example illustrated, the call agent 35 establishes in the telephone handset the channels listed below. These channels are established in a conventional manner when calls are placed as described below:

Channel 1: a media path for audio directed from user B to user A. This first media path or channel includes Real Time Protocol (RTP) session 31R and an associated codec 31C. Packets that contain sound traveling from user B to user A over the RTP session 31R and the packets are translated into analog sound by codec 31C. The sound is sent to telephone speaker 24A through the mixer 38.

Channel 2: a media path for audio from user A to user B. This second media path includes RTP session 32R and an associated codec 32C. Analog sound from user A comes from microphone 24B and it is translated into packets by codec 32C. These packets are sent to user B using the RTP session 32R.

For the second call illustrated in FIG. 1, the call agent 35 establishes the following channels:

Channel 3: a media path for audio going from user C to user A. Channel 3 includes a RTP session designated 33R and associated codec 33C. The RTP session 33R is used to transfer packets from user C to user A. The codec 33C translates the packets into analog sound. The sound is sent to speaker 24A through the mixer 38.

Channel 4: a media path for audio from user A to user C. This media path includes RTP session 34R and an associated codec 34C. Analog sound from user A originates at microphone 24B is translated into packets by codec 34C and these packets are sent to user B using the RTP session 34R.

The IP-PBX 12A also includes a conventional network interface 36 that transfers the packets from handset 11A to network 14, and that transfers packets from network 14 to handset 11A.

The manner that the call agent 35 sets up the calls (that is establishes the channels and the RTP session) is conventional. Likewise, the manner that packets are transferred from the handset 11A to the network 14 is conventional. However, normally only one incoming channel is connected to the hand piece 24. In the embodiment shown here, the sound from multiple incoming channels is mixed in mixer 38 and the combined sound is sent to hand piece 24.

FIG. 3 shows the Hold key "H", the Partial Hold key "PH" and the Pickup key "PU". Handset 11A includes a Path Control Logic 30 that controls that paths from the outgoing channels. The control units designated C2 and C4 in the outgoing channel can be implemented via software control of the associated RTP sessions. Alternatively the control units C2 and C4 can be separate software control units. That is, the control units designated C2 and C4 in the outgoing channels can be implemented using a variety of conventional programming technologies.

In the specific embodiment shown here, the IP-PBX 12A also includes soft key management software 37. The keys H, PH and PU in handset 11A can be what are called "soft-Keys". Soft key consist of images that appear on a touch screen and the associated controls to detect when the screen is touched at the position where the keys appear. Soft key management subroutine 37 establishes the soft keys on handset 11A and it receives the signals when the user presses on of the soft keys.

It is noted that in FIG. 3, the dotted lines indicate control signal paths and the solid lines indicate media signal paths.

In the specific embodiment shown herein, there are separate Hold and Partial Hold keys and a user must place a call on Hold or Partial Hold and then pick up the second call. In other embodiments, when a user picks up a second call the first call is automatically placed on partial hold.

Figure 4:
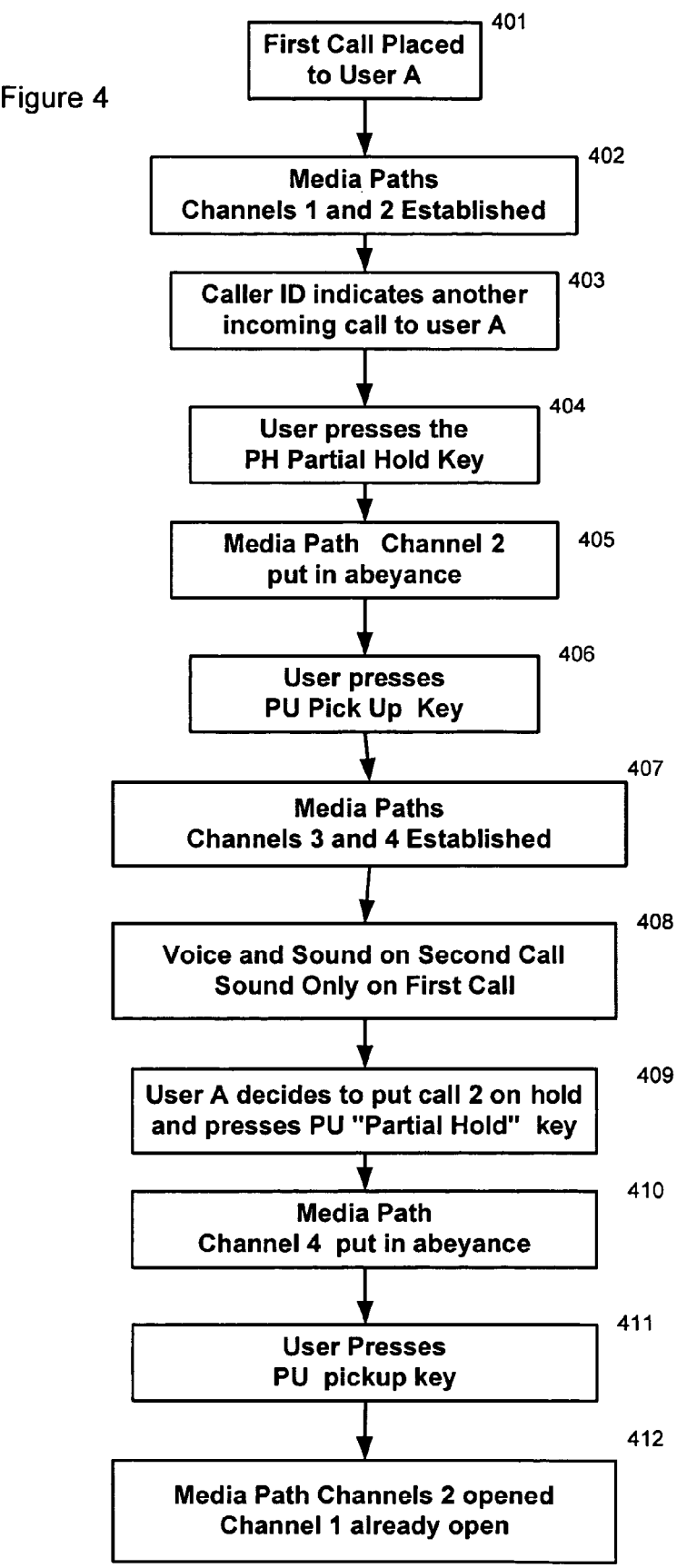
FIG. 4 is a flow diagram showing the operation of the first embodiment.

FIG. 4 is a block diagram that illustrates the operation of the system. It should be understood that FIG. 4, is just an example, and a large number of various other scenarios are also possible. Furthermore, this example relates to a system where a user must first place a call and hold or partial hold and then pick up the second call. In other embodiments, a call is automatically placed on partial hold when a user picks up a second call.

The example illustrated in FIG. 4 relates to:

1) A first telephone call from user B to user A.

2) A second telephone call from user C to user A.

The example begins at block 401 when user A receives the call from user B. At this point, the call agent 35 establishes media paths for channels 1 and 2 as indicated by block 402. These media paths are established in a conventional manner.

Next as indicated by block 403, user A receives an indication that there is another person trying to place a call to the same number. This indication can be given to user A by means of conventional Caller ID technology. In this example, when caller A receives an indication that there is another call, user A decides to place call 1 on partial hold as indicated by block 404. In order to do this, the user presses the PH key.

If the user pressed the H key, the first call would be placed on hold in a conventional manner, the user could pick up the second call, but the user would hear nothing from the first call. In this example the user A presses the PH (partial hold) key. In response to the PH key being pressed, path control 30 blocks the outgoing channel 2 and effectively places this media path in abeyance as indicated by block 405, that is the outgoing channel is muted. The channel is not closed, however, no packets are transferred to the network on channel 2 and thus the user B does not hear what user A is saying. Channel 1 remains open and A can hear anything user B says.

Next user A presses the PU key to pickup the second call as indicated by block 406. At this point, as indicated by block 407, the call agent 35 establishes media path channels 3 and 4. At this point user A can carry on a conversation with user C and hear anything that user B says as indicated by block 408.

At some later time, user A decides to put call 2 on partial hold as indicated by block 409. When the user presses the PH key, media path 4 is placed in abeyance as indicated by block 410. User can now press the PU key as indicated by block 411. When channel 2 is re-opened, user A can both hear and talk to user B since media path 1 was already open as indicated by block 412.

The example illustrated in FIG. 4 is just one of many examples that are possible. The point of the example is to show that with this embodiment, a user has an option of placing a call in a partial hold mode, whereby the outbound channel is muted (i.e. blocked) but the incoming channel is kept open so that the user can still hear, in the background the sound occurring on the channel placed on hold.

In the examples discussed above, the calls were all two party calls. It should be understood that the embodiment described above operates in the same manner if one of the calls is a conference call. That is, if a user places a conference call in a partial hold mode, the user will still be able to hear what transpires in the conference call, but, the other parties will not be able to hear what that user says.

Another embodiment of the invention allows multiple calls to be placed on partial hold. With such an embodiment, a user can be engaged in one conversation and have multiple other calls in a partial hold mode, where the outgoing channel of the calls is muted. In this way a user can monitor multiple calls and hear in the background if anything happens on any one of the calls.

In the embodiment described above, RTP channels are not closed when a call is placed on either conventional hold or on partial hold. It is noted that in other embodiments, when, for example, user A places a user B on hold, user B is connected to a different server that provides hold music. In this type of system, the channels to and from user A are closed by the call setup agent when a call is placed on hold. When the call is again picked up, new channels are established. Thus, in such an embodiment there is additional interaction between the hold key and the call agent in the IP-PBX. With the embodiment shown here, when the H or PH keys are pressed, no signal is sent to the call agent telling it to close a channel.

Handset 11A can, for example, be similar to the VoIP telephone handset of marketed by Cisco Systems Inc. as the model 7690 IP phone. However, in additions to the functions performed by a conventional IP phone, handset 11A includes the circuitry and/or software to perform the functions described above.

The IP-PBX 12A can consist of a combination of call processing software and a server platform on which the software operates. For convenience of reference, herein, call processing software and the server on which such software is operating is referred to as an IP PBX.

The call processing software in the IP-PBX 12A can be a program, marketed by Cisco Systems Inc. and referred to in the literature as the Cisco CallManager. There is a publicly available book: Entitled, "Cisco CallManager Fundamentals: A Cisco AVVID Solution": by John Alexander, Chris Pearce, Anne Smith, and Delon Whetten, published by Cisco Press, ISBN: 1587050080, July 2001. The above referenced book describes the Cisco CallManager program.

The server on which the call processing software operates can, for example, be a server such as the Medial Convergence Server (MCS) model 7815-1000, 7825-1133 or 7835-1266 commercially marketed by Cisco Systems.

It is noted that while the specific embodiment described here includes a server and call processing software commercially marketed by Cisco System Inc., a variety of other servers and call processing software systems are commercially available. Other embodiments of the inventions could utilize various other call processing software systems.

It is noted that various techniques can be used so that the background sound can be made more distinguishable from the sound in the primary channel. For example the techniques illustrated in issued U.S. Pat. No. 6,011,851 can be used. These techniques make the sounds more distinguishable, but it is not essential that these techniques be used. The content of issued U.S. Pat. No. 6,011,851 is hereby incorporated herein by reference.

It should also be noted that while in the embodiments described herein, the units shown in FIG. 3 constitute software programs, in other embodiments, some or all of these functions can be performed by appropriately designed hardware.

Embodiments of the disclosed technology can include a computer program stored on a computer readable medium (e.g., a computer medium having computer readable program code embodied therein), wherein the program, when executed in a system (e.g., a VoIP telephone system), can cause the system to perform certain steps (e.g., operations).

While the invention has been shown and described with respect to preferred embodiments, thereof, it should be understood that various changes in format and detail can be made without departing form the spirit and scope of the present invention. The scope of the invention is limited only by the appended claims.

We claim:

1. A method, comprising:
  initiating a first call, comprising:
    establishing a first outgoing media path through a Voice over Internet Protocol (VoIP) telephone handset; and
    establishing a first incoming media path through a mixer of the VoIP telephone handset to a hand piece coupled with the VoIP telephone handset;
  responsive to a first user input received from a soft key of a touch screen on the VoIP telephone handset, placing a first partial hold on the first call, the first partial hold comprising a blocking of the first outgoing media path and a maintaining of the first incoming media path through the mixer to the hand piece;
  initiating a second call, comprising:
    establishing a second outgoing media path through the VoIP telephone handset; and
    establishing a second incoming media path through the mixer to the hand piece;
  responsive to a second user input received from the soft key, placing a second partial hold on the second call, the second partial hold comprising a blocking of the second outgoing media path and a maintaining of the second incoming media path through the mixer to the hand piece; and
  initiating a third call, comprising:
    establishing a third outgoing media path through the VoIP telephone handset; and
    establishing a third incoming media path through the mixer to the hand piece.

2. The method of claim 1, wherein placing the first partial hold on the first call comprises lowering a volume of the first incoming media path to a first reduced level.

3. The method of claim 2, wherein placing the second partial hold on the second call comprises lowering a volume of the second incoming media path to a second reduced level.

4. The method of claim 1, further comprising responsive to a third user input received from the soft key, placing a third partial hold on the third call, the third partial hold comprising a blocking of the third outgoing media path.

5. The method of claim 4, wherein placing the third partial hold on the third call comprises lowering a volume of the third incoming media path to a third reduced level.

6. The method of claim 1, further comprising releasing at least one of the first and second partial holds.

7. The method of claim 4, further comprising releasing at least one of the first, second, and third partial holds.

8. The method of claim 1, further comprising soft key management software establishing the soft key of the touch screen, wherein the soft key management software is stored on an Internet Protocol Private Branch Exchange (IP-PBX).

9. A system, comprising:
  a Voice over Internet Protocol (VoIP) telephone handset comprising:
    a mixer; and
    a touch screen comprising a soft key; and
  a hand piece coupled with the VoIP telephone handset,
  wherein the VoIP telephone handset is configured to:
    initiate a first call by:
      establishing a first outgoing media path through the VoIP telephone handset; and
      establishing a first incoming media path through the mixer of the VoIP telephone handset to the hand piece coupled with the VoIP telephone handset;
    responsive to a first user input received from the soft key of the touch screen on the VoIP telephone handset, place a first partial hold on the first call, the first partial hold comprising a blocking of the first outgoing media path and a maintaining of the first incoming media path through the mixer to the hand piece;
    initiate a second call by:
      establishing a second outgoing media path through the VoIP telephone handset; and
      establishing a second incoming media path through the mixer to the hand piece;
    responsive to a second user input received from the soft key, place a second partial hold on the second call, the second partial hold comprising a blocking of the second outgoing media path and a maintaining of the second incoming media path through the mixer to the hand piece; and
    initiate a third call by:
      establishing a third outgoing media path through the VoIP telephone handset; and
      establishing a third incoming media path through the mixer to the hand piece.

10. The system of claim 9, wherein the VoIP telephone handset is configured to place the first partial hold on the first call by lowering a volume of the first incoming media path to a first reduced level.

11. The system of claim 10, wherein the VoIP telephone handset is configured to place the second partial hold on the second call by lowering a volume of the second incoming media path to a second reduced level.

12. The system of claim 9, wherein the VoIP telephone handset is further configured to:
  responsive to a third user input received from the soft key, place a third partial hold on the third call, the third partial hold comprising a blocking of the third outgoing media path.

13. The system of claim 12, wherein the VoIP telephone handset is configured to place the third partial hold on the third call by lowering a volume of the third incoming media path to a third reduced level.

14. The system of claim 9, wherein the VoIP telephone handset is further configured to release at least one of the first and second partial holds.

15. The system of claim 12, wherein the VoIP telephone handset is further configured to release at least one of the first, second, and third partial holds.

16. The system of claim 9, further comprising soft key management software establishing the soft key of the touch screen, wherein the soft key management software is stored on an Internet Protocol Private Branch Exchange (IP-PBX).

17. An apparatus, comprising:
means for initiating a first call, comprising:
- means for establishing a first outgoing media path through a Voice over Internet Protocol (VoIP) telephone handset; and
- means for establishing a first incoming media path through a mixer of the VoIP telephone handset to a hand piece coupled with the VoIP telephone handset;

responsive to a first user input received from a soft key of a touch screen on the VoIP telephone handset, means for placing a first partial hold on the first call, the first partial hold comprising a blocking of the first outgoing media path and a maintaining of the first incoming media path through the mixer to the hand piece;

means for initiating a second call, comprising:
- means for establishing a second outgoing media path through the VoIP telephone handset; and
- means for establishing a second incoming media path through the mixer to the hand piece;

responsive to a second user input received from the soft key, means for placing a second partial hold on the second call, the second partial hold comprising a blocking of the second outgoing media path and a maintaining of the second incoming media path through the mixer to the hand piece; and means for initiating a third call, comprising:
- means for establishing a third outgoing media path through the VoIP telephone handset; and
- means for establishing a third incoming media path through the mixer to the hand piece.

18. The apparatus of claim 17, wherein the means for placing the first partial hold on the first call comprises means for lowering a volume of the first incoming media path to a first reduced level.

19. The apparatus of claim 18, wherein the means for placing the second partial hold on the second call comprises means for lowering a volume of the second incoming media path to a second reduced level.

20. The apparatus of claim 17, further comprising responsive to a third user input received from the soft key, means for placing a third partial hold on the third call, the third partial hold comprising a blocking of the third outgoing media path.

21. The apparatus of claim 20, wherein the means for placing the third partial hold on the third call comprises means for lowering a volume of the third incoming media path to a third reduced level.

22. The apparatus of claim 17, further comprising means for releasing at least one of the first and second partial holds.

23. The apparatus of claim 20, further comprising means for releasing at least one of the first, second, and third partial holds.

* * * * *